UNITED STATES PATENT OFFICE.

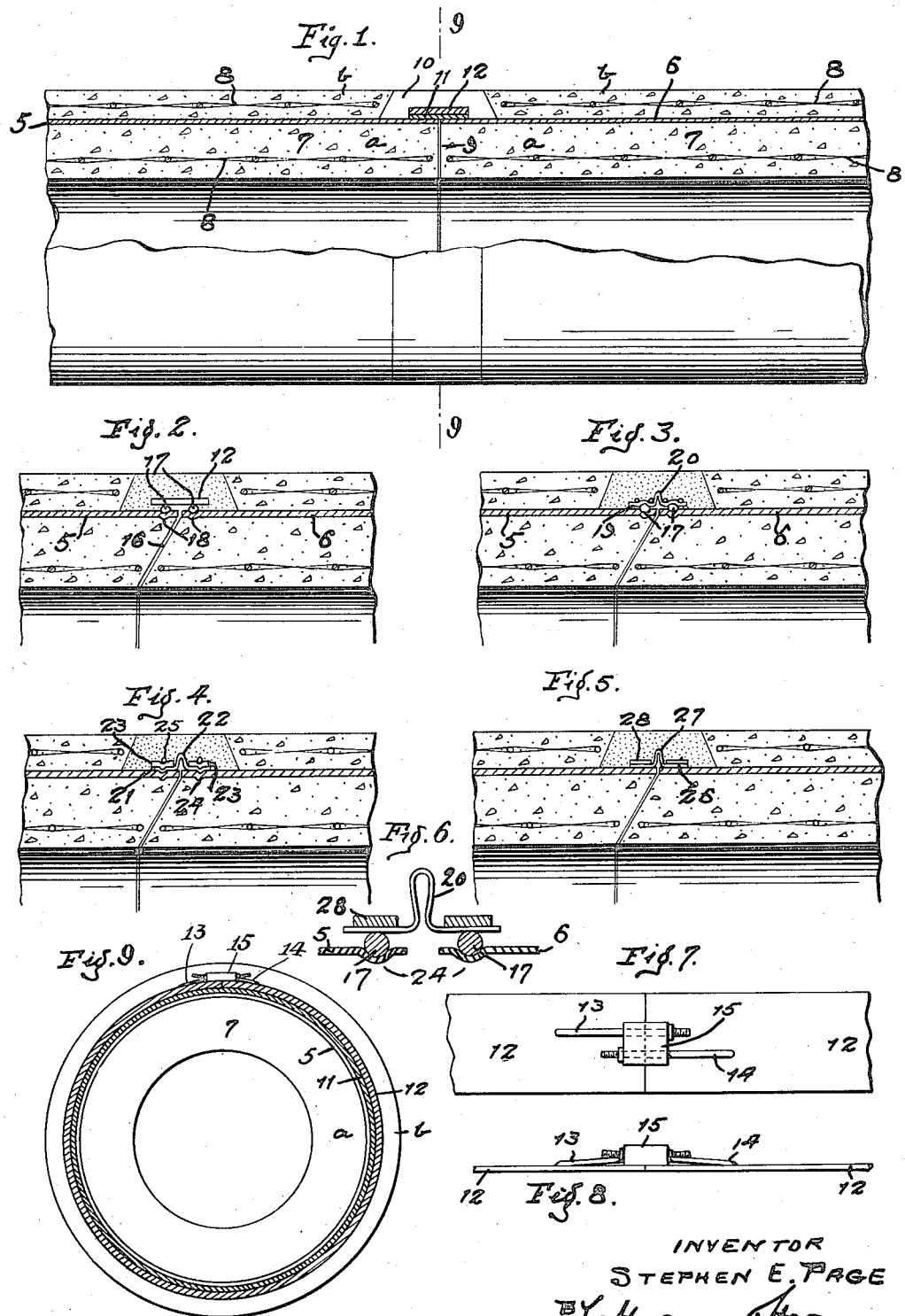

STEPHEN EUGENE PAGE, OF BROOKLYN, NEW YORK, ASSIGNOR TO UNITED CONCRETE PIPE CO., OF NEW YORK, N. Y., A CORPORATION OF DELAWARE.

PIPE JOINT.

1,424,580.   Specification of Letters Patent.   Patented Aug. 1, 1922.

Application filed November 7, 1919. Serial No. 336,497.

*To all whom it may concern:*

Be it known that I, STEPHEN EUGENE PAGE, a citizen of the United States of America, residing at 101 Columbia Heights, in the city of New York, borough of Brooklyn, county of Kings, and State of New York, have invented certain new and useful Improvements in Pipe Joints, of which the following is a specification.

My invention relates to pipe joints, and particularly to an expansion joint for reenforced concrete pressure lines, the object of my invention being to provide a joint which will remain tight while at the same time permitting relative displacement of the abutting ends due to expansion and contraction incident to variations in temperature.

In the accompanying drawings—

Fig. 1 is a longitudinal elevation partially broken away to show a pipe joint in which my invention is embodied in one form;

Figs. 2, 3, 4, 5 and 6 are similar views showing various modifications in the joint;

Figs. 7 and 8 are respectively plan and side elevations of the clamping device of Fig. 1 drawn to a larger scale Fig. 9 is a transverse section on the line 9—9. Fig. 1.

The pipe to which the present invention relates is of the type in which sheet metal pipe lengths 5 and 6 are embedded in concrete 7, and as indicated, additional mesh reenforce 8 may be embedded in the concrete on both the inside and outside of the metal pipe. In pipes of this character it is difficult to maintain a tight joint between the pipe lengths on account of temperature variations with the incident expansion and contraction of the pipe lengths. The joint is particularly apt to develop leaks if the line be under pressure. The present invention provides a sealed joint of such construction that expansion and contraction may take place without breaking the seal.

As shown in Fig. 1, the concrete interior lining *a* extends the entire length of the metal pipe 5 or 6 and forms a butt joint at 9, when the pipe lengths are juxtaposed. The outer concrete shell *b*, however, terminates at a point spaced from the metal pipe ends and is so shaped as to form an undercut recess 10 at the outer periphery of the joint. The seal for the abutting ends of the metal pipes 5 and 6 is secured by a band 11 of ductile metal, such as sheet lead, wrapped around the joint and overlying the pipe ends. A clamping shoe 12 of steel, or the like, co-extensive with the lead band 11, is positioned around the latter and drawn very tight by any suitable clamping means. In Figs. 7, 8 and 9, I have indicated draw-up bolts 13 and 14 secured to the opposite ends of the clamping shoe 12 and engaging an intermediate block 15, but it will be understood that any suitable device may be used for clamping the shoe 12 around the lead band. After the shoe has been properly secured, the undercut recess 10 is filled with mortar flush to the face of the pipe.

The clamping shoe 12 not only holds the lead packing ring 11 against "blowing" under the influence of heavy pressure from within the pipe, but also keeps the ring 11 of ductile material in sealing engagement with the ends of the metal pipes. Nevertheless, relative movement of the pipes may take place due to expansion or contraction without breaking the seal, since the pipe ends are free to slide within the band 11 without lessening the tightness of the seal effected thereby. The support of the ends 5 and 6 of the metal pipes by the heavy concrete lining *b* insures sufficient rigidity at this point to permit the draw-up of the clamping shoe without material deflection or injury to the metal pipe ends.

In the modification shown in Fig. 2, the inner concrete lining, instead of being butt-jointed, as in Fig. 1, is shaped to form a bell and spigot joint at 16. Furthermore, instead of using a single ring or band of sheet lead, I substitute a pair of packing rings 17 of lead or other suitable ductile material which lie in grooves 18 formed in the ends of the metal pipes. The clamping shoe 12, pressing on these lead rings 17, forms a tight joint therewith, while at the same time the pipes carrying with them the lead rings 17, are free to slip with respect to the clamping shoe without breaking the joint.

In Fig. 3 I use a sheet metal expansion ring 19 overlying the sealing rings 17, and provided with a crimp 20 of sufficient amplitude to permit expansion and contraction at the joint without relative displacement between the expansion ring and the sealing rings 17, or between the latter and the grooved ends of the pipes. The play is taken up entirely by the opening and closing of the crimp 20. The clamping shoe is substituted by pairs of clamping rings 25 overlying the side flanges of the expansion ring 19 and straddling the sealing rings 17.

In Fig. 4 the sealing rings are replaced by a sealing band 21 with expansion crimp 22, held in position by a pair of clamping shoes 23, which overlie the side flanges of the crimped sealing band 21. The parts are all grooved at 24 and are held in fixed position on the ends of the pipe by tie wires 25, the crimp 22 in the sealing band 21 again serving to compensate relative movement between the pipe ends.

In Fig. 5 the sealing band 26 is crimped at 27, and is held by a pair of clamping shoes 28, but the grooves 24 are omitted so that in case the crimp 27 should be insufficient to compensate the relative movement incident to expansion and contraction, the pipes 5 and 6 are free to slide with relation to the sealing band.

In Fig. 6 a similar provision is made for a construction such as shown in Fig. 3. Here the crimped sheet metal expansion ring 20 overlies the sealing rings 17 seated in grooves 24 in the pipe ends. But instead of bending the expansion ring flanges over the sealing rings and holding the parts against relative displacement, I maintain the side flanges of the expansion ring flat beneath clamping shoes 28, so that in case the crimp in ring 20 proves insufficient to take up the contraction between the pipes 5 and 6, the flanges may slide across the sealing rings 17 without breaking the seal.

Various other modifications will readily occur to those skilled in the art without departing from what I claim as my invention.

I claim—

1. A joint for reenforced concrete pipe comprising metal pipes embedded in concrete, and supported at their abutting ends by the concrete lining of the pipe, but exposed on their outer faces at the joint, ductile metallic sealing material engaging the outer face of the metal pipes at the joint, and clamping means for forcing said sealing material into tight joint with the metal pipe on opposite sides of the parting and at the point at which it is supported by said concrete lining, said joint comprising a member crimped at the parting to compensate the relative movement of the pipe lengths due to expansion and contraction.

2. A joint for reenforced concrete pipe comprising abutting pipe ends having projecting spigots of substantially the same diameter, a sealing ring of ductile metal slipped upon and spanning said spigot ends, said ring having an expansion crimp overlying the parting of the joint, together with clamping rings engaging said sealing ring on opposite sides of said crimp and serving to secure the same to said spigot ends of the pipes, substantially as described.

In testimony whereof I have signed my name to this specification.

STEPHEN EUGENE PAGE.